US010774202B2

(12) United States Patent
Ek et al.

(10) Patent No.: US 10,774,202 B2
(45) Date of Patent: Sep. 15, 2020

(54) PROCESS FOR PRODUCING MULTIMODAL POLYETHYLENE BLENDS INCLUDING ULTRA-HIGH MOLECULAR WEIGHT COMPONENTS

(71) Applicant: Borealis AG, Vienna (AT)

(72) Inventors: Carl-Gustaf Ek, Frolunda (SE); Thomas Ratzsch, Altenberg (AT); Bernd Kretzschmar, Dresden (DE)

(73) Assignee: BOREALIS AG, Vienna (AT)

( * ) Notice: Subject to any disclaimer, the term of this patent is extended or adjusted under 35 U.S.C. 154(b) by 161 days.

(21) Appl. No.: 15/512,186

(22) PCT Filed: Dec. 21, 2015

(86) PCT No.: PCT/EP2015/002588
§ 371 (c)(1),
(2) Date: Mar. 17, 2017

(87) PCT Pub. No.: WO2016/102062
PCT Pub. Date: Jun. 30, 2016

(65) Prior Publication Data
US 2017/0275442 A1 Sep. 28, 2017

(30) Foreign Application Priority Data

Dec. 22, 2014 (EP) .................... 14004368

(51) Int. Cl.
C08L 23/06 (2006.01)
C08J 3/00 (2006.01)
(52) U.S. Cl.
CPC ............... C08L 23/06 (2013.01); C08J 3/005 (2013.01); C08J 2323/06 (2013.01); C08J 2423/06 (2013.01); C08L 2205/025 (2013.01); C08L 2205/03 (2013.01); C08L 2207/068 (2013.01)
(58) Field of Classification Search
CPC ................. C08L 23/06; C08L 2205/03; C08L 2205/025; C08L 2207/068; C08J 3/005; C08J 2423/06; C08J 2323/06
See application file for complete search history.

(56) References Cited

U.S. PATENT DOCUMENTS

2004/0192819 A1* 9/2004 Raty .................. B29B 7/002
524/315

FOREIGN PATENT DOCUMENTS

| EP | 1655334 A1 | 5/2006 |
| EP | 1655335 A1 | 5/2006 |
| WO | WO 2013/060736 A1 | 5/2013 |

OTHER PUBLICATIONS

Frankland, J.; Plastics Technology, Extrusion: Reducing Energy, Part II: 'Adiabatic' Extrusion, 2011, p. 1-4.*
International Search Report dated Mar. 9, 2016 from PCT/EP2015/002588.
Busico et al.; Alk-1-ene Polymerization in the Presence of a Monocyclopentadienyl Zirconium(IV) Acetamidinate Catalyst: Microstructural and Mechanistic Insignts; Macromolecular Rapid Communications; vol. 28; pp. 1128-1134; 2007.
Castignolles et al.; Detection and quantification of branching in polyacrylates by size-exclusion chromatography (SEC) and melt-state $^{13}$C NMR spectroscopy; Polymer; vol. 50; pp. 2373-2383; 2009.
Filip et al.; Heteronuclear decoupling under fast MAS by a rotor-synchronized Hahn-echo pulse train; Journal of Magnetic Resonance; vol. 176; pp. 239-243; 2005.
Griffin et al.; Low-load rotor-synchronized Hahn-echo pulse train (RS-HEPT) $^1$H decoupling in solid-state NMR: factors affecting MAS spin-echo dephasing times; Magnetic Resonance in Chemistry; vol. 45; pp. S198-S208; 2007.
Heino et al.; Rheological characterization of polyethylene fractions; Theoretical and Applied Rheology; Proc. XIth Int. Congr. on Rheology; Brussels, Belgium; 1992.
Heino et al.; The influences of molecular structure on some rheological properties of polyethylene; Annual Transactions of the Nordic Rheology Society; vol. 3; 1995.
Kaye et al.; Definition of terms relating to the non-ultimate mechanical properties of polymers; Pure & Applied Chemistryl vol. 70; No. 3; pp. 701-754; 1998.
Klimke et al.; Optimisation and application of polyolefin branch quantification by melt-state $^{13}$C NMR spectroscopy; Macromolecular Chemistry and Physics; vol. 207; pp. 382-395; 2006.
Parkinson et al.; Effect of branch length on 13C NMR relaxation properties in molten poly[ethylene-co-(α-olefin)] model systems; Macromolecular Chemistry and Physics; vol. 208; pp. 2128-2133; 2007.

(Continued)

Primary Examiner — Robert S Jones, Jr.
(74) Attorney, Agent, or Firm — Fay Sharpe LLP

(57) ABSTRACT

The present application relates to a process for producing a multimodal polyethylene composition comprising the steps of at least partially melting a first polyethylene resin (A) having a viscosity average molecular weight My of equal to or more than 700 kg/mol to equal to or less than 10,000 kg/mol and a density of equal to or more than 920 kg/m³ to equal to or less than 960 kg/m³ in a first homogenizing device, at least partially melting a second polyethylene resin (B) having a Mw of equal to or more than 50 kg/mol to less than 700 kg/mol, and a density of equal to or more than 910 kg/m³ to equal to or less than 960 kg/m³ in a second homogenizing device, combining the at least partially molten first polyethylene resin (A) with the at least partially molten second polyethylene resin (B) in said second homogenizing device, compounding the combined first polyethylene resin (A) and second polyethylene resin (B) in said second homogenizing device to form a multimodal polyethylene composition, wherein the multimodal polyethylene composition has a melt flow rate MFR$_5$ (190° C., 5 kg) of 0.01 to 10.0 g/10 min and a density of equal to or more than 910 kg/m³ to equal to or less than 970 kg/m³ and a polyethylene composition obtainable by said process.

8 Claims, 1 Drawing Sheet

(56) References Cited

OTHER PUBLICATIONS

Figure 1:
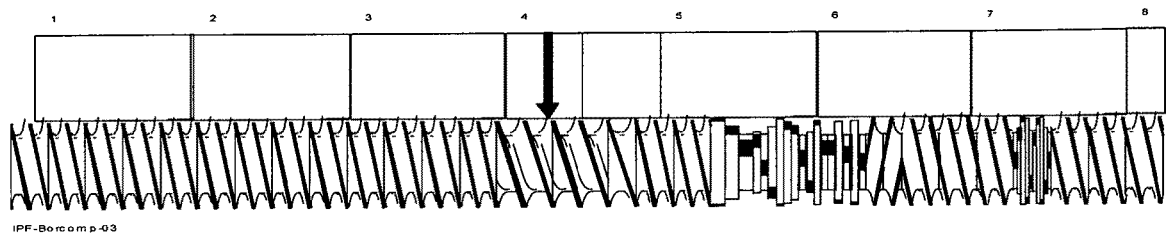

Pollard et al.; Observation of chain branching in polyethylene in the solid state and melt via $^{13}$C NMR spectroscopy and melt NMR relaxation time measurements; Macromolecules; Vo. 37; pp. 813-825; 2004.
Randall; A review of high resolution liquid $^{13}$carbon nuclear magnetic resonance characterizations of ethylene-based polymers; JMS—Rev. Macromol. Chem. Phys.; C29(2&3);pp. 201-317; 1989.
Zhou et al.; A new decoupling method for accurate quantification of polyethylene copolymer composition and triad sequence distribution with $^{13}$C NMR; Journal of Magnetic Resonance; vol. 17; pp. 225-233; 2007.
Zhang, Haichen et al, Extrusion Processing of Ultra-High Molecular Weight Polyethylene, Extrusion of Metal, Polymers, and Food Products, 2018, pp. 165-179, Intechopen.com.

\* cited by examiner

PROCESS FOR PRODUCING MULTIMODAL POLYETHYLENE BLENDS INCLUDING ULTRA-HIGH MOLECULAR WEIGHT COMPONENTS

This application is a 371 of PCT Application Serial No. PCT/EP2015/002588, filed Dec. 21, 2015, which claims priority to European Patent Application Serial No. 14004368.8, filed Dec. 22, 2014.

The present application relates to a process for producing a multimodal polyethylene composition with an ultra-high molecular weight component and a conventional polyethylene component by separately melting the ultra-high molecular weight component and the conventional polyethylene component and combining the melts. The resultant multimodal polyethylene composition shows an improved homogeneity at a minimum degradation during melt-blending.

BACKGROUND OF THE INVENTION

In multimodal polyethylene resins the high molecular weight component usually with comonomer incorporation is responsible for the strength, including long term strength and how well this fraction is incorporated in the total polymer mass is the key for the final product properties, in particular for high-strength and high performance products such as PE100 or PE100+ pipe resins, high-end film resins or blow moulding resins.

Multimodal polyolefins, especially multimodal polyethylenes are inherently difficult to homogenize due to a large difference in viscosities and a large difference in particle size of the various reactor powder particles. Especially in sequential polymerization processes the high molecular weight and high viscous powder particles are normally considerably larger than the lower molecular weight particles. During the homogenization step the particles of high molecular weight polyethylene are difficult to homogenize within the polymer melt so that so-called "white spots" occur in the compounded material. These white spots usually have a size of below 10 to about 50 micrometer, even though they occasionally can have a size of up to 0.1 mm or even 0.5 mm, and consist of high molecular weight polymer particles that have not been adequately dispersed in the composition. Further, when compounding polymer compositions e.g. for the production of films gel particles with a size of about 0.01 to 1 mm often occur. These gel particles also consist of high molecular weight polymer particles not adequately dispersed and appear as disfiguring inhomogeneities in the finished film. Still further, inhomogeneities in multimodal polymer compositions may also increase roughness of the surface of articles produced thereof.

One possibility to break up these high viscous particles is to use higher shear forces during compounding. Higher shear forces are usually applied to the extent which is necessary with regard to the needs, the degradation limits of the polymer, energy costs, costs for necessary process stabilizers and other physical limits such as low viscosities and lower shear forces due to high temperatures generated and limited cooling capacity.

High shear forces, however, applied as shear flow which is the predominant flow in extruders and mixers, are in most cases not sufficient to break up high molecular weight polymer particles in multimodal polyethylene resins with large viscosity differences between the polymer fractions.

These compatibility problems particularly apply in the case an ultra high molecular weight component (UHMW) is included into a polyethylene composition for further improving strength properties, as it becomes more and more difficult to homogenize the ultra high molecular weight particles into the polymer matrix.

Thus, there is still a need for methods to incorporate ultra high molecular weight components into multimodal polyethylene resins such as that a homogeneous blend with a minimum of UHMW particles, so-called white spots is obtained at a minimum degradation of the polymer chains.

It has surprisingly been found that this object can be achieved when blending the UHMW polyethylene component with a polyethylene resin of lower weight average molecular weight which are both at least partially in liquid form to form the desired polyethylene composition. This is achieved by at least partially melting the UHMW polyethylene component and the polyethylene resin of lower weight average molecular weight prior to the compounding step. Said composition surprisingly shows a low amount of white spots even when blended under mild conditions in order to avoid degradation.

SUMMARY OF THE INVENTION

The present invention is based on the surprising finding that the above-mentioned improved homogeneity can be achieved by a process for producing a multimodal polyethylene composition comprising the following steps:
i) at least partially melting a first polyethylene resin (A) having a viscosity average molecular weight My of equal to or more than 700 kg/mol to equal to or less than 10,000 kg/mol and a density of equal to or more than 920 kg/m$^3$ to equal to or less than 960 kg/m$^3$ in a first homogenizing device,
ii) at least partially melting a second polyethylene resin (B) having a Mw of equal to or more than 50 kg/mol to less than 700 kg/mol, and a density of equal to or more than 910 kg/m$^3$ to equal to or less than 960 kg/m$^3$ in a second homogenizing device,
iii) combining the at least partially molten first polyethylene resin (A) with the at least partially molten second polyethylene resin (B) in said second homogenizing device,
iv) compounding the combined first polyethylene resin (A) and second polyethylene resin (B) in said second homogenizing device to form a multimodal polyethylene composition,
wherein the multimodal polyethylene composition has a melt flow rate MFR$_5$ (190° C., 5 kg) of 0.01 to 10.0 g/10 min and a density of equal to or more than 910 kg/m$^3$ to equal to or less than 970 kg/m$^3$.

In a further aspect the present invention provides a polyethylene composition obtainable by a process comprising the following steps:
i) at least partially melting a first polyethylene resin (A) having a viscosity average molecular weight My of equal to or more than 700 kg/mol to equal to or less than 10,000 kg/mol and a density of equal to or more than 920 kg/m$^3$ to equal to or less than 960 kg/m$^3$ in a first homogenizing device,
ii) at least partially melting a second polyethylene resin (B) having a Mw of equal to or more than 50 kg/mol to less than 700 kg/mol, and a density of equal to or more than 910 kg/m$^3$ to equal to or less than 960 kg/m$^3$ in a second homogenizing device,
iii) combining the at least partially molten first polyethylene resin (A) with the at least partially molten second polyethylene resin (B) in said second homogenizing device, iv) compounding the combined first polyethylene resin (A) and second polyethylene resin (B) in said second homogenizing device to form a multimodal polyethylene composition, wherein the multimodal polyethylene composition has a melt flow rate MFR$_5$ (190° C., 5 kg) of 0.01 to 10.0 g/10 min and a density of equal to or more than 910 kg/m$^3$ to equal to or less than 970 kg/m$^3$.

DETAILED DESCRIPTION OF THE INVENTION

Definitions

A polyethylene composition according to the present invention denotes a polymer derived from at least 50 mol-% ethylene monomer units and additional comonomer units.

The term 'homopolymer' thereby denotes a polymer consisting essentially of ethylene monomer units. Due to the requirements of large-scale polymerization it may be possible that the ethylene homopolymer includes minor amounts of additional comonomer units, which usually are below 0.05 mol %, preferably below 0.01 mol % of the ethylene homopolymer. Accordingly, the term 'copolymer' denotes a polymer derived from ethylene monomer units and additional comonomer units in an amount of more than 0.05 mol %.

Usually, a polyethylene composition comprising at least two polyethylene fractions, which have been produced under different polymerisation conditions resulting in different (weight average) molecular weights for the fractions, is referred to as "multimodal". The prefix "multi" relates to the number of different polymer fractions of the composition consists of. Thus, for example, a composition consisting of two fractions only is called "bimodal", whereas a composition consisting of three fractions is called "trimodal".

The ultra-high molecular weight (UHMW) component in the polyethylene composition is the component having a viscosity average molecular weight Mv of 700 kg/mol to 10,000 kg/mol. Thus, in the wording of claim 1 the UHMW component denotes the first polyethylene resin (A) having a viscosity average molecular weight Mv of equal to or more than 700 kg/mol to equal to or less than 10,000 kg/mol.

For determining the molecular weight of a polyolefin resin or component several statistical methods are known in the art. In practice four averages are used, representing the weighted mean taken with the mole fraction, the weight fraction, and two other functions which can be related to measured quantities:

Number average molar mass or Mn (also loosely referred to as Number Average Molecular Weight) with $Mn = \Sigma M_i N_i / \Sigma N_i$ Mass average molar mass or Mw (w is for weight; also commonly referred to as weight average) with $Mw = \Sigma M_i^2 N_i / \Sigma M_i N_i$ Z average molar mass or Mz with $Mz = \Sigma M_i^3 N_i / \Sigma M_i^2 N_i$ Viscosity average molar mass or Mv with $Mv = [\Sigma M_i^{1+a} N_i / \Sigma M_i N_i]^{1/a}$ Here a is the exponent in the Mark-Houwink equation that relates the intrinsic viscosity to molar mass.

The term 'base resin' denotes the polymeric part of the composition without fillers such as carbon black. A person skilled in the art will understand that the measurements as to the base resin require the presence of stabilizers.

In addition to the base resin, usual additives for utilization with polyolefins, such as pigments (e.g. carbon black), stabilizers (e.g. antioxidant agents), antacids and/or anti-UV's, antistatic agents and utilization agents (such as processing aid agents) may be present in the polyethylene composition. Preferably, the amount of these additives is 10 wt % or below, more preferably 8 wt % or below, most preferably 5 wt % or below, of the composition. Further, the composition may comprise fillers, like mineral fillers and modifiers, in an amount of up to 20% by weight of the composition, preferably up to 10% by weight of the composition, provided that such fillers have no negative impact on the properties of the composition. Preferably, however, such mineral fillers are not present. For the purpose of the determination of the homogeneity of the polyethylene composition by means of the white spot area and the ISO rating as described in the example section the polyethylene composition does not comprise any mineral fillers as these fillers would impair the measurement.

Preferably, the composition comprises carbon black in an amount of 8 wt % or below, more preferably in an amount of 1 to 4 wt %, of the total composition.

Further preferred, the amount of additives different from carbon black and the optional fillers is 1 wt % or less, more preferably 0.5 wt % or less.

The term "homogenization device" denotes a device suitable for homogenizing polyolefin melts or at least partially molten polyolefin resins by distributive mixing. Suitable homogenization devices are mixers, kneaders and extruders. These devices are known in the art.

Extruders can be classified as small extruders and large extruders. An extruder is denoted as small if the temperature of the melt in the extruder effectively could be influenced by the extruder barrel temperatures by heat conduction, i.e. by external heating or cooling of the barrel.

The term "blending" denotes any method for admixing components of the polyethylene composition such as polyethylene components and additives.

Suitable blending methods are in situ blending, such as polymerizing one polyethylene compound in the presence of another polyethylene compound, or mechanical blending, such as dry blending of solid compounds such as powders and/or pellets, melt blending of liquid compounds such as melts of polyethylene compounds or blending of a liquid compound with a solid compound. Devices for these blending methods are known in the art.

General

Process

First Homogenizing Step

In the process according to the invention the first polyethylene resin (A) is homogenized by at least partially melting the first polyethylene resin (A) in a first homogenizing device.

Thereby, polyethylene resin (A) can be fed to the first homogenizing device as pellets or as powder. Preferably, polyethylene resin (A) is introduced as powder.

Suitable first homogenization devices are mixers or extruders. Especially suitable are twin screw extruders such as e.g. Coperion ZSK twin screw extruders.

The set point for the barrel temperature in the extruder is preferably from 150° C. to 220° C., more preferably from 160° C. to 210° C. and most preferably from 170° C. to 200° C. For small extruders and also for large extruders during the start-up the barrels are typically heated, for instance, by electric bands. However, as it is well understood by the person skilled in the art large extruders generally operate adiabatically and then the barrel temperatures are not controlled and practically linked to the temperatures generated in the melt along the length of the extruder.

The throughput is selected based on the desired production volume. As the person skilled in the art understands greater throughput can be achieved by extruders having a greater diameter. Useful scale-up principles for mixing is presented, among others, in Rauwendaal, Polymer Extrusion, Hanser Publishers, Munich, 1986 (ISBN 3-446-14196-0), in Table 8-4 on page 439. It shows that the ratio of the output rates is directly proportional to the cube of the ratio of the diameters.

$$\dot{V}_2 = \dot{V}_1 \cdot \left(\frac{D_2}{D_1}\right)^3$$

where $V_2$ and $D_2$ are the output rate and diameter of the large extruder and $V_1$ and $D_1$ are output rate and the diameter of the small extruder.

For small laboratory and pilot scale extruders throughput within a range of from about 1 up to about 200 kg/h would be appropriate and for large production scale extruders the throughput could be from about 300 up to about 20,000 kg/h.

The screw speed is preferably from 300 min$^{-1}$ to 800 min$^{-1}$, more preferably 400 min$^{-1}$ to 600 min$^{-1}$.

For a co-rotating twin screw extruder, the feed port of the first homogenisation device is preferably located so that the L/D is from 12 to 20, more preferably from 14 to 18, wherein L is the distance from the feed port to the die and D is the diameter.

It is possible that the first homogenization device has an additional feed port downstream of the above-mentioned feed port. It is then preferred that the distance between such additional feed port and the die would be such that the ratio of said distance to the screw diameter would not be less than 10.

It is, however, preferred to feed all the components to the first homogenisation device via one feed port. For counter-rotating twin screw extruders/mixers, which normally are shorter in length compared to co-rotating twin screw extruders, e.g. Kobe LCM and Japan Steel Works CIM, all the components are preferably feed via one feed port.

To either one or both feeding zone additives as defined above can be added.

In the first homogenization device the first polyethylene resin (A) is at least partially melted. It is preferred that at least 20 wt %, more preferably at least 50 wt %, still more preferably at least 75 wt % and most preferably at least 95 wt % of the first polyethylene resin (A) is melted when exiting the first homogenization device. In a preferred embodiment 100 wt % of the first polyethylene resin (A) is melted when exiting the first homogenization device. Usually, in a large extruder the 100 wt % of the first polyethylene resin (A) is melted when exiting the first homogenization device.

The at least partially melted polyethylene resin (A) exiting the first homogenization device is preferably introduced into the second homogenization device without solidification or pelletizing.

It is preferred to introduce polyethylene resin (C) also to the first homogenisation device. Then, the polyethylene resins (A) and (C) may be introduced through the same feed port or through different feed ports. It is preferred to introduce both polyethylene resins (A) and (C) through the same feed port.

Second Homogenization Step

In the process according to the invention the second polyethylene resin (B) is homogenized by at least partially melting the second polyethylene resin (B) in a second homogenizing device.

Preferably the second homogenisation device has a diameter which is equal to or greater than the diameter of the first homogenisation device. Especially preferably the second homogenisation device has a greater diameter than the first homogenisation device.

Thereby, polyethylene resin (B) can be fed to the second homogenizing device as pellets or as powder. Where large extruders are used near the polymer production facilities it is usually more convenient to feed the polyethylene resin (B) as powder. On the other hand, for small extruders or where the extruder is located far away from the production facilities it may be more convenient to feed the polyethylene resin (B) as pellets.

Preferably, the second homogenizing device has at least two feeding zones. Preferably a second feeding zone is situated downstream of the first feeding zone. It is particularly preferred to introduce the polyethylene resin (B) into the first feeding zone. Then the polyethylene resin (B) melts downstream the first feeding zone and passes past the second feeding zone where the melt comprising the polyethylene resin (A) is introduced into the second homogenising device.

For a co-rotating twin screw extruder, preferably the ratio L1/D, where L1 is the distance between the first feed port in the first feeding zone and the die and D is the diameter of the second homogenising device, is from 20 to 35, more preferably from 22 to 30, Further, preferably the ratio L2/D, where L2 is the distance between the second feed port in the second feeding zone and the die, is from 16 to 28, and more preferably from 18 to 26. Furthermore, the distance between the first feed port and the second feed port is preferably such that the ratio (L1–L2)/D is from 1 to 10, and more preferably from 2 to 8, such as from 2 to 6.

For a counter-rotating twin screw extruder/mixer, the second feed port is preferably located downstream the melt valve or throttle where the melt pressure is low and upstream the second mixing section of the unit. The distance from melt throttle and the second feed port downstream is preferably between 0 to 2 L/D and more preferably between 0 to 1 L/D.

Preferably, at least part of the polyethylene resin (B), more preferably 100 wt % of the polyethylene resin (B) is introduced in the first feeding zone. Preferably at least part of the at least partly molten polyethylene resin (A), more preferably 100 wt % of the at least partly molten polyethylene resin (A) is introduced in the second feeding zone.

To either one or both feeding zone additives as defined above can be added.

In the second homogenization device the second polyethylene resin (B) is at least partially melted before reaching the second feeding zone. It is preferred that at least 20 wt %, more preferably at least 50 wt %, still more preferably at least 75 wt % and most preferably at least 95 wt % of the first polyethylene resin (A) is melted before reaching the second feeding zone. In a preferred embodiment 100 wt % of the first polyethylene resin (A) is melted before reaching the second feeding zone.

Compounding Step in the Second Homogenizing Device

Preferably at the second feeding zone of the second homogenizing device the at least partially molten first polyethylene resin (A) is introduced to the second homogenizing device and is combined with the at least partially molten second polyethylene resin (B).

Preferably downstream said second feeding zone the combined first polyethylene resin (A) and second polyethylene resin (B) are compounded to form a multimodal polyethylene composition.

Suitable second homogenizing devices are mixers or extruders. Especially suitable are twin screw extruders such as e.g. ZSK twin screw extruders by Coperion, CIMP and TEX twin screw extruders by Japan Steel Works and Kobe LCM and KTX twin screw extruders. For each type of extruder the diameter can be chosen based on the desired production rate using the principles discussed above. The diameter is usually indicated in the extruder name, such as ZSK40 (40 mm extruder), ZSK80 (80 mm extruder) CIMP-90 (90 mm extruder).

The set point for the barrel temperature in the extruder is preferably from 150° C. to 250° C., more preferably from 170° C. to 230° C. and most preferably from 200° C. to 220° C. The temperature settings are normally selected to be close to the temperatures which will be generated in the extruder in the melt by friction via the screw rotation. For small extruders and also for large extruders during the start-up the barrels are typically heated, for instance, by electric bands. However, as it is well understood by the person skilled in the art large extruders generally operate adiabatically and then the barrel temperatures are not controlled.

The screw speed in the co-rotating twin screw extruder is preferably from 100 $min^{-1}$ to 220 $min^{-1}$, more preferably 120 $min^{-1}$ to 180 $min^{-1}$. For the counter-rotating twin screw mixer the screw speed is normally higher, preferably from 200 $min^{-1}$ to 550 $min^{-1}$, more preferably from 260 $min^{-1}$ to 500 $min^{-1}$. The screw speed is often related to the throughput in kg/hour, of the extruder, e.g. for a large two-speed extruder, the higher speed is chosen when target is to produce close to the nameplate capacity and the lower speed often chosen when milder conditions and/or lower throughputs are targeted. With a variable speed drive the extrusion conditions are easier to tailor for the particular throughput and homogenisation conditions required.

Again, the throughput is set by the desired production volume. For scale-up purposes the discussion given for the first homogenisation device is valid also for the second homogenisation device.

Preferably the polyethylene composition exiting the second homogenizing device is pelletized before storage.

Blending of First Polyethylene Resin (A) and Third Polyethylene Resin (C)

In an especially preferred embodiment of the process according to the invention the polyethylene resin (A) is introduced into the first homogenising device together with polyethylene resin (C).

Thereby, the first polyethylene resin (A) is blended with a third polyethylene resin (C) to form a blend of polyethylene resins (A) and (C) prior to introducing the first polyethylene resin (A) to the first homogenization device.

The weight ratio of polyethylene resin (A) to polyethylene resin (C) in the blend of polyethylene resins (A) and (C) is from 45:55 to 80:20, more preferably from 47:53 to 75:25, most preferably from 50:50 to 70:30.

In this embodiment a blend of polyethylene resins (A) and (C) is used in the first homogenization step so that for this embodiment the description of the first homogenization step above reads "blend of polyethylene resins (A) and (C)" instead of "first polyethylene resin (A)".

In one embodiment of the process of the invention the blend of polyethylene resins (A) and (C) is formed by in situ blending of polyethylene resins (A) and (C), preferably in two subsequent steps of a multistage polymerization process. In such a multistage process the blend of polyethylene resins (A) and (C) is formed by polymerizing, respectively copolymerizing, ethylene in a reactor cascade formed by at least a first reactor and a second reactor, whereby preferably the first reactor is a loop reactor and further preferably, the second reactor is a gas phase reactor. Thereby, polyethylene resins (A) and (C) are polymerized in subsequent reactor stages wherein the fraction polymerized in the second reactor is polymerized in the presence of the fraction polymerized in the first reactor.

However, in the preferred embodiment of the process of the invention the blend of polyethylene resins (A) and (C) is formed by melt blending of polyethylene resins (A) and (C).

Thereby, polyethylene resins (A) and (C) can be fed to the melt blending device as pellets or as powder.

For a co-rotating twin screw extruder the feed port of the first homogenisation device is preferably located so that the L/D is from 12 to 20, more preferably from 14 to 18, wherein L is the distance from the feed port to the die and D is the diameter. It is possible that the first homogenization device has an additional feed port downstream of the above-mentioned feed port. It is then preferred that the distance between such additional feed port and the die would be such that the ratio of said distance to the screw diameter D would not be less than 10. It is, however, preferred to feed all the components to the first homogenisation device via one feed port. For a counter-rotating twin screw extruder/mixer all the components are preferably feed via one feed port.

To either one or both feeding zone additives as defined above can be added.

In a preferred embodiment of the process of the invention the second homogenizing device is the main extruder for compounding the multimodal polyethylene composition. Thereby, said first homogenizing device is preferably a side feed extruder having an exit which is connected downstream of the feeding zone of the main extruder.

The different components of the polyethylene composition according to the invention and obtainable according to the process according to the invention as characterized as follows:

Polyethylene Resin (A)

Polyethylene resin (A) can be either a homopolymer of ethylene or a copolymer of ethylene, preferably a homopolymer of ethylene, and is characterized by the following properties:

Mv

Polyethylene resin (A) has a viscosity average molecular weight Mv of 700 kg/mol to 10,000 kg/mol, preferably from 700 kg/mol to 7,000 kg/mol, most preferably from 700 kg/mol to 5,000 kg/mol, determined according to ASTM 4020-81.

Density

Polyethylene resin (A) has a density of equal to or more than 920.0 $kg/m^3$ and equal to or less than 960.0 $kg/m^3$, more preferably of equal to or more than 925.0 $kg/m^3$ and equal to or less than 950.0 $kg/m^3$, and most preferably of equal to or more than 930.0 $kg/m^3$ and equal to or less than 940.0 $kg/m^3$ determined according to ISO 1183-1:2004.

Polyethylene resin (A) can comprise additives as defined above.

Polyethylene Resin (B)

Polyethylene resin (B) can be a unimodal or multimodal, such as bimodal, ethylene homo- or copolymer.

It is preferred that the polyethylene resin (B) is multimodal.

Preferably, the polyethylene resin (B) is a copolymer of ethylene with at least one alpha-olefin comonomer unit. The alpha-olefin comonomer unit preferably is selected from alpha-olefin co-monomer units with 3 to 12 carbon atoms, more preferably 4 to 8 carbon atoms. Suitable alpha-olefin comonomer units are 1-butene, 1-hexene and 1-octene. Thereby, 1-butene and 1-hexene are most preferred.

Polyethylene resin (B) can comprise additives as defined above.

Mw

Polyethylene resin (B) has a weight average molecular weight Mw of 50 kg/mol to less than 700 kg/mol, preferably from 70 kg/mol to 500 kg/mol, most preferably from 100 kg/mol to 300 kg/mol, determined by GPC.

$MFR_5$

Polyethylene resin (B) preferably has a melt flow rate $MFR_5$ (190° C., 5 kg) of 0.01 to 5.0 g/10 min, more preferably of 0.05 to 4.0 g/10 min, and most preferably 0.1 to 3.0 g/10 min determined according to ISO 1133.

Density

Polyethylene resin (B) has a density of equal to or more than 910.0 kg/m$^3$ and equal to or less than 960.0 kg/m$^3$, more preferably of equal to or more than 915.0 kg/m$^3$ and equal to or less than 955.0 kg/m$^3$, and most preferably of equal to or more than 920.0 kg/m$^3$ and equal to or less than 950.0 kg/m$^3$ determined according to ISO 1183-1:2004.

Polymerization

Polyethylene resin (B) is usually made by a multi-stage process, i.e. a process which makes use of at least two reactors, one for producing a lower molecular weight component and a second for producing a higher molecular weight component. These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

Known two-stage processes are for instance liquid phase-liquid phase processes, gas phase-gas phase processes and liquid phase-gas phase processes. It is also known that these two-stage processes can further be combined with one or more additional polymerization steps selected from gas phase, slurry phase or liquid phase polymerization processes.

Polyethylene resin (B) is preferably produced in a multistage process, where lower molecular weight and higher molecular weight polymers (components) are produced in different polymerization steps, in any order.

The polymerisation is conducted in the presence of an olefin polymerisation catalyst. The catalyst may be any catalyst which is capable of producing the desired ethylene polymer. Suitable catalysts are, among others, Ziegler-Natta catalysts based on a transition metal, such as titanium, zirconium and/or vanadium or metallocene catalysts or late transition metal catalysts. Especially Ziegler-Natta catalysts and metallocene catalysts are useful as they can produce polymers within a wide range of molecular weight with a high productivity.

Suitable Ziegler-Natta catalysts preferably contain a magnesium compound, an aluminium compound and a titanium compound supported on a particulate support.

Polyethylene Resin (C)

The multimodal polyethylene composition may additionally comprise polyethylene resin (C). Polyethylene resin (C) is preferably introduced to the multimodal polyethylene composition by blending polyethylene resin (C) with polyethylene resin (A) prior to at least partially melting the blended polyethylene resins (A) and (C) in the first homogenisation device.

The weight ratio of polyethylene resin (A) to polyethylene resin (C) in the blend of polyethylene resins (A) and (C) is from 45:55 to 80:20, more preferably from 47:53 to 75:25, most preferably from 50:50 to 70:30.

Polyethylene resin (C) can be a unimodal or multimodal, such as bimodal, ethylene homo- or copolymer.

It is preferred that the polyethylene resin (C) is multimodal.

Preferably, the polyethylene resin (C) is a copolymer of ethylene with at least one alpha-olefin comonomer unit. The alpha-olefin comonomer unit preferably is selected from alpha-olefin co-monomer units with 3 to 12 carbon atoms, more preferably 4 to 8 carbon atoms. Suitable alpha-olefin comonomer units are 1-butene, 1-hexene and 1-octene. Thereby, 1-butene and 1-hexene are most preferred.

Polyethylene resin (C) can comprise additives as defined above.

Mw

Polyethylene resin (C) has a weight average molecular weight Mw of 50 kg/mol to less than 700 kg/mol, preferably from 70 kg/mol to 500 kg/mol, most preferably from 100 kg/mol to 300 kg/mol, determined by GPC.

$MFR_5$

Polyethylene resin (C) preferably has a melt flow rate $MFR_5$ (190° C., 5 kg) of 0.01 to 5.0 g/10 min, more preferably of 0.05 to 4.0 g/10 min, and most preferably 0.1 to 3.0 g/10 min determined according to ISO 1133.

Density

Polyethylene resin (C) has a density of equal to or more than 910.0 kg/m$^3$ and equal to or less than 960.0 kg/m$^3$, more preferably of equal to or more than 915.0 kg/m$^3$ and equal to or less than 955.0 kg/m$^3$, and most preferably of equal to or more than 920.0 kg/m$^3$ and equal to or less than 950.0 kg/m$^3$ determined according to ISO 1183-1:2004.

Polymerization

Polyethylene resin (C) is usually made by a multi-stage process, i.e. a process which makes use of at least two reactors, one for producing a lower molecular weight component and a second for producing a higher molecular weight component. These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

Known two-stage processes are for instance liquid phase-liquid phase processes, gas phase-gas phase processes and liquid phase-gas phase processes. It is also known that these two-stage processes can further be combined with one or more additional polymerization steps selected from gas phase, slurry phase or liquid phase polymerization processes.

Polyethylene resin (C) is preferably produced in a multistage process, where lower molecular weight and higher molecular weight polymers (components) are produced in different polymerization steps, in any order.

The polymerisation is conducted in the presence of an olefin polymerisation catalyst. The catalyst may be any catalyst which is capable of producing the desired ethylene polymer. Suitable catalysts are, among others, Ziegler-Natta catalysts based on a transition metal, such as titanium, zirconium and/or vanadium or metallocene catalysts or late transition metal catalysts. Especially Ziegler-Natta catalysts and metallocene catalysts are useful as they can produce polymers within a wide range of molecular weight with a high productivity.

Suitable Ziegler-Natta catalysts preferably contain a magnesium compound, an aluminium compound and a titanium compound supported on a particulate support.

Polyethylene resin (C) can be different from polyethylene resin (B) in at least one of the above defined properties.

In an especially preferred embodiment polyethylene resin (C) is the same as polyethylene resin (B).

Polyethylene Composition

The multimodal polyethylene composition according to the invention comprises polyethylene resins (A) and (B), and optionally polyethylene resin (C), which are blended according to the process of the invention.

Preferably, the base resin of the composition consists of the polyethylene resins (A) and (B), and optionally polyethylene resin (C).

In one preferred embodiment, the base resin of the composition consists of the polyethylene resins (A) and (B).

The composition can comprise additives as defined above.

The weight ratio of the first polyethylene resin (A) to the second polyethylene resin (B) in the polyethylene composition is preferably from 0.5:95.5 to 50:50, more preferably from 3:97 to 35:65, most preferably from 8:92 to 30:70.

In the presence of a third polyethylene resin (C) in the polyethylene composition the weight ratio of the first polyethylene resin (A) to the combined second polyethylene resin (B) and third polyethylene resin (C) in the polyethylene composition is preferably from 0.5:95.5 to 50:50, more preferably from 3:97 to 35:65, most preferably from 8:92 to 30:70.

Preferably the amount of polyethylene resin (A) in the polyethylene composition is 0.5 to 50 wt %, more preferably 1 to 40 wt %, more preferably 3 to 35 wt %, still more preferably 5 to 32 wt %, and most preferably 8 to 30 wt % of the total polyethylene composition The polyethylene composition is characterized by the following properties:

$MFR_5$

The composition according to the present invention preferably has a melt flow rate $MFR_5$ (190° C., 5 kg) of 0.01 to 10.0 g/10 min, more preferably of 0.03 to 9.0 g/10 min, and most preferably 0.05 to 8.0 g/10 min determined according to ISO 1133.

$MFR_{21}$

The composition according to the present invention preferably has a melt flow rate $MFR_{21}$ (190° C., 21.6 kg) of 0.5 to 300 g/10 min, preferably of 0.7 to 250 g/10 min, and most preferably of 1.0 to 200 g/10 min determined according to ISO 1133.

Density

The composition according to the present invention preferably has a density of equal to or more than 910.0 kg/m$^3$ and equal to or less than 970.0 kg/m$^3$, more preferably of equal to or more than 912.0 kg/m$^3$ and equal to or less than 969.0 kg/m$^3$, and most preferably of equal to or more than 915.0 kg/m$^3$ and equal to or less than 968.0 kg/m$^3$ determined according to ISO 1183-1:2004.

The density of the composition is influenced by the density of the base resin and can further be adjusted by the amount of filler, usually carbon black, in the composition.

The density of the base resin is mainly influenced by the amount and type of comonomer. In addition to that, the nature of the polymer originating mainly from the catalyst used as well as the melt flow rate play a role. In addition to that, it should be stressed that the comonomer does not need to be a single comonomer. Mixtures of comonomers are also possible.

The composition is further characterized by specific rheological properties.

Complex Viscosity $Eta_{0.1}$

The composition according to the present invention preferably has a complex viscosity determined at a frequency of 0.1 kPa, $eta_{0.1}$, of 5,000 Pa's to 100,000 Pa·s, more preferably 6,000 Pa·s to 85,000 Pa·s, even more preferably 8,000 Pa·s to 70,000 Pa·s and most preferably 10,000 Pa·s to 55,000 Pa·s. For certain applications, such as HD pipe, MD pipe or injection moulding applications, $eta_{0.1}$ can be of 5,000 Pa·s to 400,000 Pa·s, preferably of 6,000 Pa·s to 350,000 Pa·s, even more preferably of 8,000 Pa·s to 300,000 Pa·s, and most preferably of 10,000 Pa·s to 250,000 Pa·s.

Viscosities determined at a low frequency or shear rate, such as $eta_{0.1}$, are a measure for the molecular weight of a polyethylene composition as they are directly proportional with the weight average molecular weight Mw. Thus, they can also be used as a measure for the degradation of the polyethylene composition by comparing $eta_{0.1}$ of the final composition after blending the first polyethylene resin (A) with the second polyethylene resin (B), $eta_{0.1}$ (Composition) and $eta_{0.1}$ of the second polyethylene resin (B) prior to blending, $eta_{0.1}$(B).

It is preferred that the ratio of the complex viscosity at a frequency of 0.1 rad/s of the multimodal polyethylene composition, $eta_{0.1}$ (Composition), to the complex viscosity determined at a frequency of 0.1 rad/s of the polyethylene resin (B), $eta_{0.1}$ (B), is in the range of 0.8 to 5.0, more preferably 0.9 to 4.0, and most preferably 1.0 to 3.5.

$SHI_{0.1/100}$

The composition preferably has a shear thinning index $SHI_{0.1/100}$ of 7 to 30, more preferably a shear thinning index $SHI_{0.1/100}$ of 8 to 27, even more preferably a shear thinning index $SHI_{0.1/100}$ of 9 to 24 and most preferably a shear thinning index $SHI_{0.1/100}$ of 9.5 to 21.

The shear thinning index is a measure of the broadness of the molecular weight distribution of the polyethylene composition.

White Spot Area (WSA)

The polyethylene composition according to the present invention preferably has a white spot area of not more than 5.0%, more preferably of not more than 4.0%, even more preferably of not more than 3.5% and most preferably of not more than 3.0%. The lower limit of the white spot area is usually 0.01%.

ISO Rating

The polyethylene composition according to the present invention preferably has an ISO rating of not more than 7.0, more preferably not more than 6.0, even more preferably not more than 4.0, most preferably not more than 3.5. The lower limit of the ISO rating is usually 0.1.

The white spot area test and the ISO rating are measures for the homogeneity of a polyethylene composition. When compounding polyethylene compositions e.g. for producing pipes, so-called "white spots" occur in the compounded material. These white spots usually have a size of below 10 to about 50 micrometer and consist of non-pigmented, high molecular weight polymer agglomerates/particles that have not been adequately dispersed in the composition. These inhomogeneities in polymer compositions may increase roughness of the surface of articles produced thereof and impair their strength properties.

It is known that homogeneity of a multimodal polymer composition can be improved by applying multiple compounding steps and/or particular compounding conditions to the resin coming from the reactor. These measures, however, have the disadvantage that they are associated with a significant increase in production costs for the composition and possibly degradation of the polymer.

Applications

The polyethylene compositions produced according to the present invention are suitable for different applications such as steel pipe coating, high density (HD) pipe applications, film applications, such as linear low density (LLD) films, medium density (MD) films and high density (HD) films, injection moulding applications and cable jacketing. For these different applications the polyethylene composition has the following properties:

Steel Pipe Coating

For steel pipe coating the composition according to the present invention preferably has a melt flow rate $MFR_5$ (190° C., 5 kg) of 0.05 to 5.0 g/10 min, more preferably of 0.1 to 2.5 g/10 min, and most preferably 0.2 to 1.0 g/10 min determined according to ISO 1133.

The composition preferably has a density of equal to or more than 935.0 kg/m$^3$ and equal to or less than 960.0 kg/m$^3$, more preferably of equal to or more than 936.5 kg/m$^3$ and equal to or less than 957.0 kg/m$^3$, and most preferably of equal to or more than 938.0 kg/m$^3$ and equal to or less than 955.0 kg/m$^3$ determined according to ISO 1183-1:2004.

The composition preferably has a weight average molecular weight Mw of 50 kg/mol to 300 kg/mol, more preferably 70 kg/mol to 250 kg/mol, determined by GPC.

LLD Films

For LLD films the composition according to the present invention preferably has a melt flow rate $MFR_5$ (190° C., 5 kg) of 0.5 to 5.0 g/10 min, more preferably of 0.6 to 4.0 g/10 min, and most preferably 0.8 to 3.0 g/10 min determined according to ISO 1133.

The composition preferably has a melt flow rate $MFR_{21}$ (190° C., 21.6 kg) of 10 to 100 g/10 min, preferably of 12 to 80 g/10 min, and most preferably of 15 to 70 g/10 min determined according to ISO 1133.

The composition preferably has a density of equal to or more than 910.0 kg/m$^3$ and equal to or less than 930.0 kg/m$^3$, more preferably of equal to or more than 912.5 kg/m$^3$ and equal to or less than 927.0 kg/m$^3$, and most preferably of equal to or more than 915.0 kg/m$^3$ and equal to or less than 925.0 kg/m$^3$ determined according to ISO 1183-1:2004.

The composition preferably has a weight average molecular weight Mw of 100 kg/mol to 350 kg/mol, more preferably 130 kg/mol to 300 kg/mol, determined by GPC.

MD Film

For MD films the composition according to the present invention preferably a melt flow rate $MFR_{21}$ (190° C., 21.6 kg) of 2.5 to 50 g/10 min, preferably of 3.5 to 40 g/10 min, and most preferably of 5 to 30 g/10 min determined according to ISO 1133.

The composition preferably has a density of equal to or more than 925.0 kg/m$^3$ and equal to or less than 945.0 kg/m$^3$, more preferably of equal to or more than 927.5 kg/m$^3$ and equal to or less than 943.0 kg/m$^3$, and most preferably of equal to or more than 930.0 kg/m$^3$ and equal to or less than 940.0 kg/m$^3$ determined according to ISO 1183-1:2004.

HD Films

For HD films the composition according to the present invention preferably a melt flow rate $MFR_{21}$ (190° C., 21.6 kg) of 2.5 to 20 g/10 min, preferably of 3 to 15 g/10 min, and most preferably of 4 to 10 g/10 min determined according to ISO 1133.

The composition preferably has a density of equal to or more than 940.0 kg/m$^3$ and equal to or less than 970.0 kg/m$^3$, more preferably of equal to or more than 942.0 kg/m$^3$ and equal to or less than 965.0 kg/m$^3$, and most preferably of equal to or more than 945.0 kg/m$^3$ and equal to or less than 960.0 kg/m$^3$ determined according to ISO 1183-1:2004.

Injection Moulding

For injection moulding the composition according to the present invention preferably has a melt flow rate $MFR_2$ (190° C., 2.16 kg) of 0.2 to 4.0 g/10 min, preferably of 0.4 to 3.0 g/10 min, and most preferably 0.2 to 1.0 g/10 min determined according to ISO 1133.

The composition preferably has a melt flow rate $MFR_{21}$ (190° C., 21.6 kg) of 15 to 300 g/10 min, preferably of 20 to 250 g/10 min, and most preferably of 25 to 200 g/10 min determined according to ISO 1133.

The composition preferably has a density of equal to or more than 935.0 kg/m$^3$ and equal to or less than 955.0 kg/m$^3$, more preferably of equal to or more than 936.5 kg/m$^3$ and equal to or less than 952.0 kg/m$^3$, and most preferably of equal to or more than 938.0 kg/m$^3$ and equal to or less than 950.0 kg/m$^3$ determined according to ISO 1183-1:2004.

HD Pipe

For HD pipes the composition according to the present invention preferably has a melt flow rate $MFR_5$ (190° C., 5 kg) of 0.05 to 1.0 g/10 min, more preferably of 0.08 to 0.7 g/10 min, and most preferably 0.1 to 0.4 g/10 min determined according to ISO 1133.

The composition preferably has a density of equal to or more than 945.0 kg/m$^3$ and equal to or less than 965.0 kg/m$^3$, more preferably of equal to or more than 946.5 kg/m$^3$ and equal to or less than 964.0 kg/m$^3$, and most preferably of equal to or more than 948.0 kg/m$^3$ and equal to or less than 963.0 kg/m$^3$ determined according to ISO 1183-1:2004.

MD Pipe

For MD pipes the composition according to the present invention preferably has a melt flow rate $MFR_5$ (190° C., 5 kg) of 0.05 to 1.0 g/10 min, more preferably of 0.08 to 0.7 g/10 min, and most preferably 0.2 to 0.6 g/10 min determined according to ISO 1133.

The composition preferably has a density of equal to or more than 930.0 kg/m$^3$ and equal to or less than 945.0 kg/m$^3$, more preferably of equal to or more than 930.0 kg/m$^3$ and equal to or less than 940.0 kg/m$^3$ determined according to ISO 1183-1:2004.

Cable Jacketing

For cable jacketing the composition according to the present invention preferably has a melt flow rate $MFR_5$ (190° C., 5 kg) of 0.1 to 3.0 g/10 min, more preferably of 0.2 to 2.5 g/10 min, and most preferably 0.3 to 3.0 g/10 min determined according to ISO 1133.

The composition preferably has a density of equal to or more than 918.0 kg/m$^3$ and equal to or less than 965.0 kg/m$^3$, more preferably of equal to or more than 920.0 kg/m$^3$ and equal to or less than 962.0 kg/m$^3$, and most preferably of equal to or more than 930.0 kg/m$^3$ and equal to or less than 960.0 kg/m$^3$ determined according to ISO 1183-1:2004.

EXAMPLES

1. Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR$_5$ of polyethylene is measured at a temperature 190° C. and a load of 5 kg, the MFR$_2$ of polyethylene at a temperature 190° C. and a load of 2.16 kg and the MFR$_{21}$ of polyethylene is measured at a temperature of 190° C. and a load of 21.6 kg. The quantity FRR (flow rate ratio) denotes the ratio of flow rates at different loads. Thus, FRR$_{21/5}$ denotes the value of MFR$_{21}$/MFR$_5$.

a) Density

Density of the polymer was measured according to ISO 1183-1:2004 Method A on compression moulded specimen prepared according to EN ISO 1872-2 (February 2007) and is given in kg/m$^3$.

b) Comonomer Content

Quantitative nuclear-magnetic resonance (NMR) spectroscopy was used to quantify the comonomer content of the polymers.

Quantitative $^{13}$C{$^1$H} NMR spectra recorded in the molten-state using a Bruker Advance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. {[1], [2], [6]} Standard single-pulse excitation was employed utilising the transient NOE at short recycle delays of 3 s {[1], [3]} and the RS-HEPT decoupling scheme {[4], [5]}. A total of 1024 (1k) transients were acquired per spectrum. This setup was chosen due its high sensitivity towards low comonomer contents.

Quantitative $^{13}$C{$^1$H} NMR spectra were processed, integrated and quantitative properties determined using custom spectral analysis automation programs. All chemical shifts are internally referenced to the bulk methylene signal (δ+) at 30.00 ppm {[9]}.

Characteristic signals corresponding to the incorporation of 1-hexene were observed {[9]} and all contents calculated with respect to all other monomers present in the polymer.

$H=I_{*B4}$

With no other signals indicative of other comonomer sequences, i.e. consecutive comonomer incorporation, observed the total 1-hexene comonomer content was calculated based solely on the amount of isolated 1-hexene sequences:

$H_{total}=H$

Characteristic signals resulting from saturated end-groups were observed. The content of such saturated end-groups was quantified using the average of the integral of the signals at 22.84 and 32.23 ppm assigned to the 2s and 2s sites respectively:

$S=(1/2)*(I_{2S}+I_{3S})$

The relative content of ethylene was quantified using the integral of the bulk methylene (δ+) signals at 30.00 ppm:

$E=(1/2)*I_{δ+}$

The total ethylene comonomer content was calculated based the bulk methylene signals and accounting for ethylene units present in other observed comonomer sequences or end-groups:

$E_{total}=E+(5/2)*B+(3/2)*S$

The total mole fraction of 1-hexene in the polymer was then calculated as:

$fH=(H_{total}(E_{total}H_{total})$

The total comonomer incorporation of 1-hexene in mole percent was calculated from the mole fraction in the usual manner:

$H[\text{mol}\%]=100*fH$

The total comonomer incorporation of 1-hexene in weight percent was calculated from the mole fraction in the standard manner:

$H[\text{wt }\%]=100*(fH*84.16)/((fH*84.16)+((1-fH)*28.05))$

[1] Klimke, K., Parkinson, M., Piel, C., Kaminsky, W., Spiess, H. W., Wilhelm, M., Macromol. Chem. Phys. 2006; 207:382.

[2] Parkinson, M., Klimke, K., Spiess, H. W., Wilhelm, M., Macromol. Chem. Phys. 2007; 208:2128.

[3] Pollard, M., Klimke, K., Graf, R., Spiess, H. W., Wilhelm, M., Sperber, O., Piel, C., Kaminsky, W., Macromolecules 2004; 37:813.

[4] Filip, X., Tripon, C., Filip, C., J. Mag. Resn. 2005, 176, 239

[5] Griffin, J. M., Tripon, C., Samoson, A., Filip, C., and Brown, S. P., Mag. Res. in Chem. 2007 45, S1, S198

[6] Castignolles, P., Graf, R., Parkinson, M., Wilhelm, M., Gaborieau, M., Polymer 50 (2009) 2373

[7] Zhou, Z., Kuemmerle, R., Qiu, X., Redwine, D., Cong, R., Taha, A., Baugh, D. Winniford, B., J. Mag. Reson. 187 (2007) 225

[8] Busico, V., Carbonniere, P., Cipullo, R., Pellecchia, R., Severn, J., Talarico, G., Macromol. Rapid Commun. 2007, 28, 1128

[9] J. Randall, Macromol. Sci., Rev. Macromol. Chem. Phys. 1989, C29, 201.

c) Rheological Parameters

The characterization of polymer melts by dynamic shear measurements complies with ISO standards 6721-1 and 6721-10. The measurements were performed on an ARES (TA Instruments) stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 230° C. applying a frequency range between 0.0631 and 100 rad/s and setting a gap of 2.0 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, $\eta^*$, the dynamic shear viscosity, $\eta'$, the out-of-phase component of the complex shear viscosity, $\eta''$ and the loss tangent, tan q, which can be expressed as follows:

$$G' = \frac{\sigma_0}{\gamma_0}\cos\delta [Pa] \quad (3)$$

$$G'' = \frac{\sigma_0}{\gamma_0}\sin\delta [Pa] \quad (4)$$

$$G^* = G' + iG'' [Pa] \quad (5)$$

$$\eta^* = \eta' - i\eta'' [Pa \cdot s] \quad (6)$$

$$\eta' = \frac{G''}{\omega} [Pa \cdot s] \quad (7)$$

$$\eta'' = \frac{G'}{\omega} [Pa \cdot s] \quad (8)$$

The determination of so-called Shear Thinning Index, which correlates with MWD and is independent of Mw, is done as described in equation 9.

$$SHI(x/y)=\eta^*_{\omega=x\ rad/s}/\eta^*_{\omega=y\ rad/s} \quad (9)$$

For example, the $SHI_{(0.1/100)}$ is defined as the ratio of the complex viscosity determined at a frequency of 0.1 rad/s to the complex viscosity determined at a frequency of 100 rad/s.

The values of storage modulus (G'), loss modulus (G"), complex modulus (G*) and complex viscosity ($\eta^*$) were obtained as a function of frequency ($\omega$).

Thereby, e.g. $\eta^*_{300}$ (eta*$_{300}$) is used as abbreviation for the complex viscosity at the frequency of 300 rad/s and $\eta_{0.05}$ (eta*$_{0.05}$) is used as abbreviation for the complex viscosity at the frequency of 0.05 rad/s.

The values are determined by means of a single point interpolation procedure, as defined by Rheoplus software. In interpolation the option from Rheoplus "Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362
[2] The influence of molecular structure on some rheological properties of polyethylene", Heino, E. L., Borealis Polymers Oy, Porvoo, Finland, Annual Transactions of the Nordic Rheology Society, 1995.).
[3] Definition of terms relating to the non-ultimate mechanical properties of polymers, Pure & Appl. Chem., Vol. 70, No. 3, pp. 701-754, 1998.

d) Molecular Weight

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i / M_i)} \quad (1)$$

$$M_w = \frac{\sum_{i=1}^{N} (A_i \times M_i)}{\sum A_i} \quad (2)$$

$$M_z = \frac{\sum_{i=1}^{N} (A_i \times M_i^2)}{\sum (A_i / M_i)} \quad (3)$$

For a constant elution volume interval $\Delta V_i$, where $A_i$ and $M_i$ are the chromatographic peak slice area and polyolefin molecular weight (MW).

A PolymerChar GPC instrument, equipped with infrared (IR) detector was used with 3×Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at 160° C. under continuous gentle shaking in the autosampler of the GPC instrument.

e) White Spot Area (WSA) and ISO Rating

A sample of the composition (including a pigment to make the inhomogeneities visible, i.e. carbon black added to Reference Example 1 in an amount as listed below) which is obtained after the compounding steps as described for the different examples below, is analysed by firstly obtaining 6 microtome cuts of 6 different parts of the sample (thickness about 10 micrometer, diameter 3 to 5 mm).

Microtome cuts with a thickness of about 10 μm were made from 6 pellets of the respective sample perpendicular to extrusion direction. The microtome cuts were characterized by light microscopy (ZEISS microscope Axioimager) at a magnification of 100 quantitatively using the White Spot Area method with SCANDIUM software. In this method all detected areas of white particles in all cuts of every sample were summarized and related to the total area of investigation (1.63 mm$^2$). The investigated area of each cut was chosen on a random basis.

The same images used for WSA were also evaluated by the rating following ISO 18553.

f) Viscosity Average Molecular Weight of the UHMWPE

The viscosity average molecular weight of the ultra-high molecular weight polyethylene was determined according to ASTM 4020-81.

2. Figures

Figure 2:
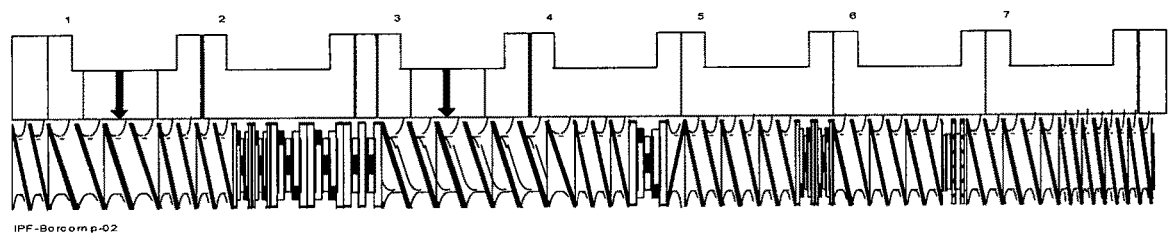

FIGS. 1 and 2 show the screw design of the extruders used for the production of the polymer mixtures and the polymers of the examples according to the invention.

Figure 3:
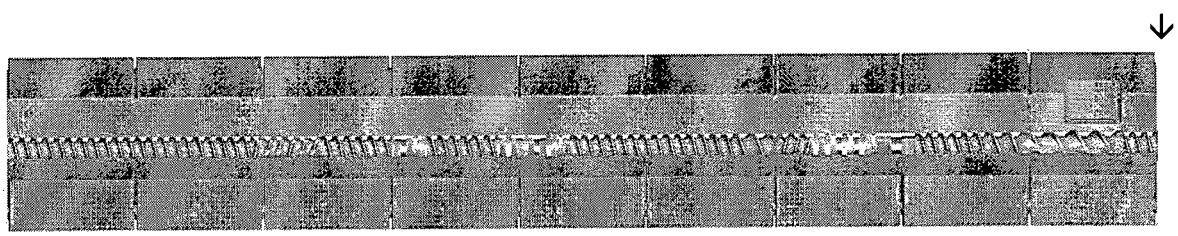

FIG. 1: Coperion ZSK 26 screw design for the production of the first polyethylene resin (A) or the mixture of the polyethylene resins (A) and (C) melt Raw material feed at the arrow on the top of the figure; melt exit at the right FIG. 2: Coperion ZSK 40 screw design for the production of the polymers of the examples according to the invention Pellets were fed at the left arrow, the melt of the first polyethylene resin (A) or the mixture of the polyethylene resins (A) and (C) from the ZSK 26 was fed at the right arrow; melt exit at the right FIG. 3: Leistritz ZE 27 MAXX screw design used in the Comparative Example 1. Polymer mixture was fed at the arrow on the right and the melt exits at the left.

3. Examples a) Polymerization of Reference Example 1 (RE1)

A loop reactor having a volume of 50 dm$^3$ was operated continuously at a temperature of 60° C. and a pressure of 62 bar. Into the reactor were introduced 42 kg/h of propane diluent, 2 kg/h of ethylene and 35 g/h of hydrogen. In addition 6.3 g/h of a solid polymerization catalyst component sold by BASF under a trade name of Lynx 200 was introduced into the reactor together with triethylaluminium cocatalyst so that the ratio of aluminium to titanium was 30 mol/mol. The rate of polymer production was about 1.8 kg/h.

The slurry from the 50 dm$^3$ loop reactor was withdrawn and transferred continuously to another loop reactor having a volume of 500 dm$^3$ and which was operated at a temperature of 95° C. and a pressure of 60 bar. Into the reactor were introduced additional propane diluent, ethylene and hydrogen. The ethylene concentration in the fluid mixture was 3.4 mol-%, based on the total number of moles in the fluid mixture, the molar ratio of hydrogen to ethylene 650 mol/kmol. The rate of polymer production was 32 kg/h and the MFR$_2$ of the ethylene homopolymer was 500 g/10 min.

The slurry from the loop reactor was withdrawn by using settling legs into a flash vessel operated at a temperature of 50° C. and a pressure of 3 bar where the hydrogen and major part of the hydrocarbons was removed from the polymer. The ethylene homopolymer was directed into a fluidized bed gas phase reactor operated at 85° C. temperature and 20 bar pressure. Into the reactor were introduced additional ethylene, 1-butene comonomer, hydrogen and nitrogen as inert gas. The ethylene concentration was 11 mol-%, based on the total number of moles in the gas mixture. Hydrogen and 1-butene were added so that the bimodal polymer had a density of 943 kg/m$^3$, an MFR$_5$ of 2 g/10 min and a weight average molecular weight Mw of 129 kg/mol. The split between the polymer produced in the loop reactor and the gas phase reactor was 50/50.

The resulting polymer powder was dried from hydrocarbons and mixed with 3000 ppm of Irganox B225, 1000 ppm of calcium stearate and 2.4% of carbon black, based on the final composition. A part of the mixture was then extruded into pellets by using a CIM90P twin screw extruder (manufactured by Japan Steel Works). The throughput was 200 kg/h and the specific energy input 170 kWh/ton.

b) Production of the Examples According to the Invention

Inventive Example 1 (Ex1)

An ultra high molecular weight PE (UHMWPE-GC002, supplied by Jingchem Corporation, Beijing, China, and having a viscosity average molecular weight of 1 650 000 g/mol, a density of 0.934 g/cm$^3$, a bulk density of 0.42 g/cm$^3$, and a content of volatile matter of 0.12% by weight was mixed with Irganox B225 and calcium stearate so that the powder mixture contained 0.3 parts per hundred of B225 and 0.15 parts per hundred of calcium stearate. This powder mixture was separately dosed into the hopper of a Coperion ZSK 26 twin screw extruder (screw diameter 25.3 mm; L/D 16) together with also separately dosed bimodal polymer pellets produced according to the Reference Example 1 above so that final blend contained 50% by weight of the UHMWPE—additive mixture and 50% by weight of the pellets of Reference Example 1. Both components were extruded by using the Coperion ZSK 26 twin screw extruder with a screw design according to FIG. 1. The adjusted barrel temperature during the extrusion was 170° C. and the screw speed was 500 min$^{-1}$. The throughput was 10 kg/h.

The pellets of Reference Example 1 were introduced into the hopper of a Coperion ZSK 40 twin screw extruder with a screw design according to FIG. 2. An increasing temperature program from 200° C. to 220° C. was adjusted, the throughput was 15 kg/h and a screw speed of 150 min$^{-1}$ was chosen. The melt from the ZSK 26 extruder was introduced into the melt port of ZSK 40. At the end of the extruder the mixed melt streams were passed through a die plate, cooled in a water-bath and cut to pellets. The pellets were then dried and recovered. From the pellets the dispersion (as the white spot area) and the dynamic viscosity was measured. Table 1 shows the WSA, ISO rating, $\eta_{0.1}$, $\eta_{100}$, SHI$_{0.1/100}$, MFR$_5$ and density.

Inventive Example 2 (Ex2)

The procedure of Inventive Example 1 (Ex1) was repeated except that the adjusted barrel temperature in ZSK 26 was 200° C. Table 1 shows the WSA, ISO rating, $\eta_{0.1}$, $\eta_{100}$, SHI$_{0.1/100}$, MFR$_5$ and density.

Inventive Example 3 (Ex3)

The procedure of Inventive Example 2 (Ex2) was repeated except that the feed into the ZSK 26 contained 70% by weight of the UHMWPE—additive mixture and 30% of the pellets of Reference Example 1. Table 1 shows the WSA, ISO rating, $\eta_{0.1}$, $\eta_{100}$, SHI$_{0.1/100}$, MFR$_5$ and density.

Inventive Example 4 (Ex4)

The procedure of Inventive Example 1 (Ex1) was repeated except that the throughput was 40 kg/h in ZSK 40. Table 2 shows the WSA, ISO rating, $\eta_{0.1}$, $\eta_{100}$, SHI$_{0.1/100}$, MFR$_5$ and density.

Inventive Example 5 (Ex5)

The procedure of Inventive Example 4 (Ex4) was repeated except that the adjusted barrel temperature in ZSK 26 was 200° C. Table 2 shows the WSA, ISO rating, $\eta_{0.1}$, $\eta_{100}$, $SHI_{0.1/100}$, $MFR_5$ and density.

Inventive Example 6 (Ex6)

The procedure of Inventive Example 5 (Ex5) was repeated except that the feed into the ZSK 26 contained 70% by weight of the UHMWPE—additive mixture and 30% of the pellets of Reference Example 1 and that the throughput in ZSK 40 was 60 kg/h. Table 2 shows the WSA, ISO rating, $\eta_{0.1}$, $\eta_{100}$, $SHI_{0.1/100}$, $MFR_5$ and density.

Comparative Example 1 (CE1)

An ultra-high molecular weight PE (UHMWPE-GC002, supplied by Jingchem Corporation, Beijing, China, and having a viscosity average molecular weight of 1 650 000 g/mol, a density of 0.934 g/cm³, a bulk density of 0.42 g/cm³, and a content of volatile matter of 0.12% by weight was mixed with Irganox B225 and calcium stearate so that the powder mixture contained 0.3 parts per hundred of B225 and 0.15 parts per hundred of calcium stearate. This powder mixture was separately dosed into the hopper of a Leistritz ZSE 27 MAXX extruder together with also separately dosed bimodal polymer pellets produced according to the Reference Example 1 above so that final blend contained 10% by weight of the UHMWPE—additive mixture and 90% by weight of the pellets of Reference Example 1. The polymer mixture was extruded by using a Leistritz ZE 27 MAXX twin screw extruder (screw diameter 28.3 mm; L/D 36) with a screw design according to FIG. 3. The adjusted barrel temperature during the extrusion was 200° C. to 220° C. and the screw speed was 500 min$^{-1}$. The throughput was 10 kg/h.

At the end of the extruder the melt was passed through a die plate, cooled in a water-bath and cut to pellets. The pellets were then dried and recovered. From the pellets the dispersion (as the white spot area) and the dynamic viscosity was measured. Table 1 shows the WSA, ISO rating, $\eta_{0.1}$, $\eta_{100}$, $SHI_{0.1/100}$, $MFR_5$ and density.

c) Results

TABLE 1

| Example | Ex1 | Ex2 | Ex3 | RE1 | CE1 |
|---|---|---|---|---|---|
| Amount UHMW- PE [wt %] | 20 | 20 | 28 | 0 | 10 |
| ISO rating | 3.1 | 2.1 | 1.3 | n.d. | 4.4 |
| WSA [%] | 0.83 | 0.20 | 0.04 | n.d. | 5.28 |
| $\eta_{0.1}$ [Pas] | 43070 | 27450 | 14700 | 12450 | 16620 |
| $\eta_{100}$ [Pas] | 2090 | 1800 | 1510 | 1060 | 1295 |
| $SHI_{0.1/100}$ | 20.6 | 15.3 | 9.7 | 11.7 | 12.8 |
| $\eta_{0.1}(Ex)/\eta_{0.1}(RE1)$ | 3.46 | 2.20 | 1.18 | — | 1.33 |
| $MFR_5$ [g/10 min] | 0.51 | 0.88 | 1.71 | n.d. | 1.32 |
| Density [kg/m³] | 948 | 947 | 944 | n.d. | 945 | n.d. not determined

TABLE 2

| Example | Ex4 | Ex5 | Ex6 | RE1 | CE1 |
|---|---|---|---|---|---|
| Amount UHMW- PE [wt %] | 10 | 10 | 14 | 0 | 10 |
| ISO rating | 2.4 | 3.9 | 2.8 | n.d. | 4.4 |
| WSA [%] | 0.24 | 2.69 | 0.51 | n.d. | 5.28 |
| $\eta_{0.1}$ [Pas] | 12830 | 15580 | 13020 | 12450 | 16620 |
| $\eta_{100}$ [Pas] | 1200 | 1330 | 1130 | 1060 | 1295 |
| $SHI_{0.1/100}$ | 10.7 | 11.7 | 11.5 | 11.7 | 12.8 |
| $\eta_{0.1}(Ex)/\eta_{0.1}(RE1)$ | 1.03 | 1.25 | 1.05 | — | 1.33 |
| $MFR_5$ [g/10 min] | 2.04 | 1.56 | 1.85 | n.d. | 1.32 |
| Density [kg/m³] | 947 | 946 | 948 | n.d. | 945 | n.d. not determined

The invention claimed is:

1. A process for producing a multimodal polyethylene composition comprising the following steps:
   i) at least partially melting a first polyethylene resin (A) having a viscosity average molecular weight Mv of equal to or more than 700 kg/mol to equal to or less than 10,000 kg/mol and a density of equal to or more than 920 kg/m³ to equal to or less than 960 kg/m³ in a first homogenizing device so that at least 20 wt % of the first polyethylene resin (A) is melted when exiting the first homogenization device,
   ii) at least partially melting a second polyethylene resin (B) having a Mw of equal to or more than 50 kg/mol to 500 kg/mol, and a density of equal to or more than 910 kg/m³ to equal to or less than 960 kg/m³ in a second homogenizing device with at least a first feeding zone and a second feeding zone, the second feeding zone situated downstream of the first feeding zone, so that the second polyethylene resin (B) introduced into the first feeding zone is at least partially melted before reaching the second feeding zone of the second homogenizing device,
   iii) combining the at least partially molten first polyethylene resin (A) with the at least partially molten second polyethylene resin (B) in said second homogenizing device,
   iv) compounding the combined first polyethylene resin (A) and second polyethylene resin (B) in said second homogenizing device to form a multimodal polyethylene composition,
   wherein the multimodal polyethylene composition has a melt flow rate MFR₅ (190° C., 5 kg) of 0.01 to 10.0 g/10 min and a density of equal to or more than 910 kg/m³ to equal to or less than 970 kg/m³;
   wherein prior to the melting step i) the first polyethylene resin (A) is blended with a third polyethylene resin (C) and the blend of the first polyethylene resin (A) and the third polyethylene resin (C) is fed to the first homogenization device; and
   wherein the second polyethylene resin (B) and the third polyethylene resin (C) are bimodal.

2. The process according to claim 1, wherein the weight ratio of the first polyethylene resin (A) to the third polyethylene resin (C) in the blend of polyethylene resins (A) and (C) is from 45:55 to 80:20.

3. The process according to claim 1, wherein the first polyethylene resin (A) is completely molten before combining with the second polyethylene resin (B).

4. The process according to claim 1, said second homogenizing device is the main extruder for compounding the multimodal polyethylene composition.

5. The process according claim 4, wherein said first homogenizing device is a side feed extruder having an exit which is connected to downstream of the melting zone of the main extruder.

6. The process according to claim 1, wherein the weight ratio of the first polyethylene resin (A) to the second polyethylene resin (B) in the polyethylene composition is 0.5:99.5 to 50:50.

7. The process according to claim 2, wherein the first polyethylene resin (A) is completely molten before combining with the second polyethylene resin (B).

8. The process according to claim 1, wherein the process is performed adiabatically.

* * * * *